April 22, 1930.   O. T. BUFFALOW ET AL   1,755,204
HEATING APPARATUS
Filed Nov. 21, 1928    2 Sheets-Sheet 2

Oscar T. Buffalow
and Albin Hajos, INVENTORS
BY Victor J. Evans
ATTORNEY

Patented Apr. 22, 1930

1,755,204

UNITED STATES PATENT OFFICE

OSCAR THOMAS BUFFALOW, OF CHATTANOOGA, TENNESSEE, AND ALBIN HAJOS, OF ATLANTA, GEORGIA

HEATING APPARATUS

Application filed November 21, 1928. Serial No. 320,998.

Our present invention has reference to a now combination, three in one, boudoir lamp, heating (stove) and warming or heating apparatus.

Our object is the provision of a lighting, warming and heating apparatus primarily designed for use in sick rooms to replace lamp, small stove, hot water bottle or electric pad and to comprise a casing of single or double walls of any suitable material that has a removable top of two sections and a fixed bottom and in which casing there is centrally arranged a heating apparatus in the order of an ordinary electric bulb, or other heating element, the said casing at its top and adjacent to the bottom thereof being provided with series of apertures which afford air inlets and outlets which are arranged at points away from the heating element so that the air will circulate through the non-apertured portion of the casing around the heating element to become thoroughly heated before being redirected therefrom through said apertures, with the result that a constant and uniform flow of heat from the apparatus is produced.

A still further object is the provision of an apparatus for this purpose that shall comprise a casing of any desired shape and material, the said casing having a bottom adjacent to its outer edge provided with an opening for a plug or for the base of an electric lamp bulb, or other heating element, whereby the heating element may be positioned approximately centrally in the casing, and further wherein the open top of the casing is provided with a cover that may or may not be apertured. The casing proper above the base has a row of apertures around the top border just below the fitting of the top cover.

The base also has apertures properly arranged for the intake or outtake of air.

The base of the device with or without a suitable shade provides an efficient boudoir lamp; by removing the shade and placing the casing proper onto the base, it provides a small stove for heating and keeping foods, water, etc., warm. Then by adding the top to the casing proper we have the completed unit, which can be used efficiently as a bed warmer, to take the place of hot water bottle or electric pad.

A still further object is the provision of a heating and warming apparatus for this purpose which shall be of an extremely simple construction, thoroughly efficient for producing the desired results and which may be safely employed without danger of short circuiting.

To the attainment of the foregoing the invention consists in the improvement as hereinafter described and definitely claimed.

Figure 1:
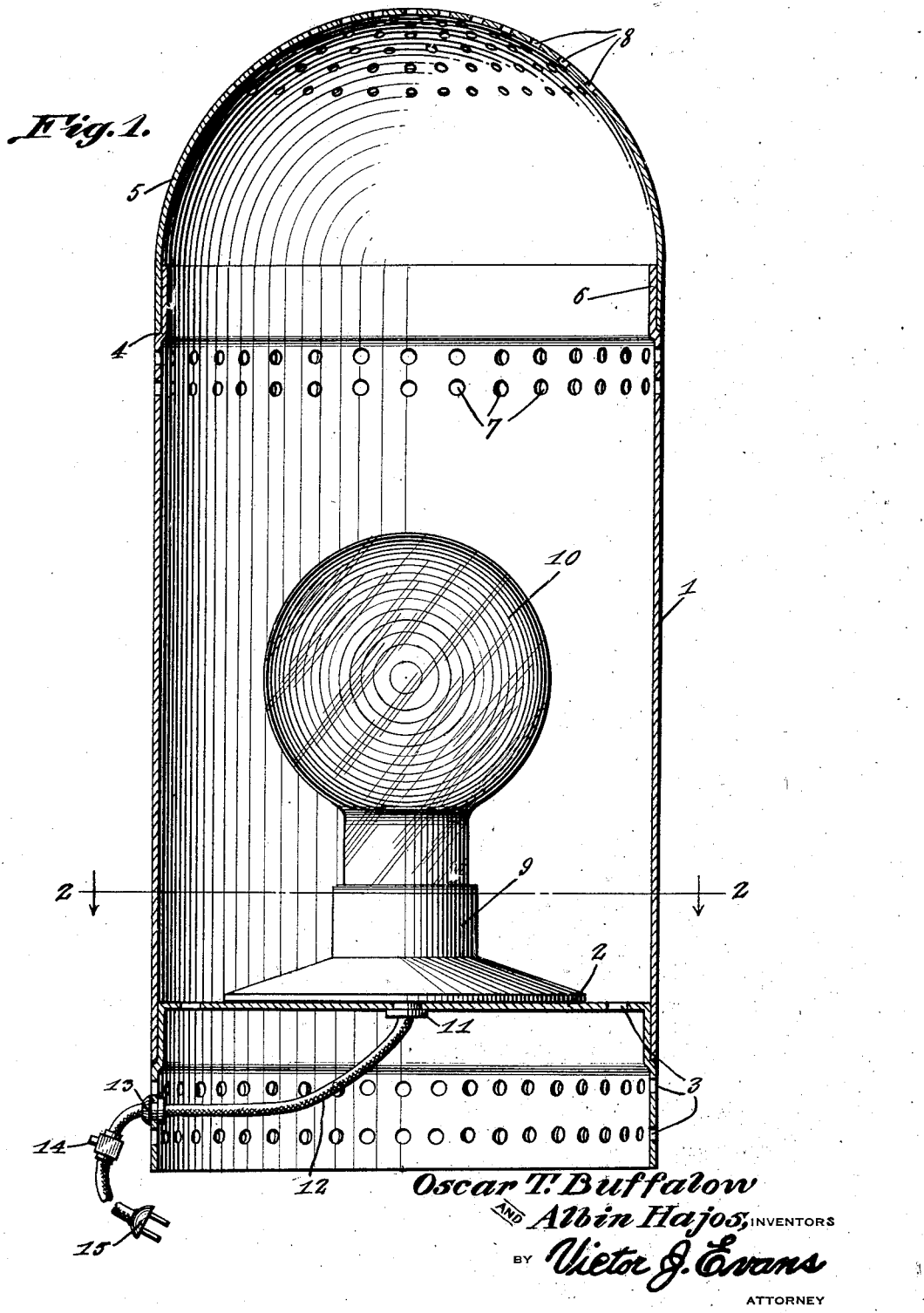
Figure 1 is an approximately central sectional longitudinal view through one form of my improvement.
Figure 2:
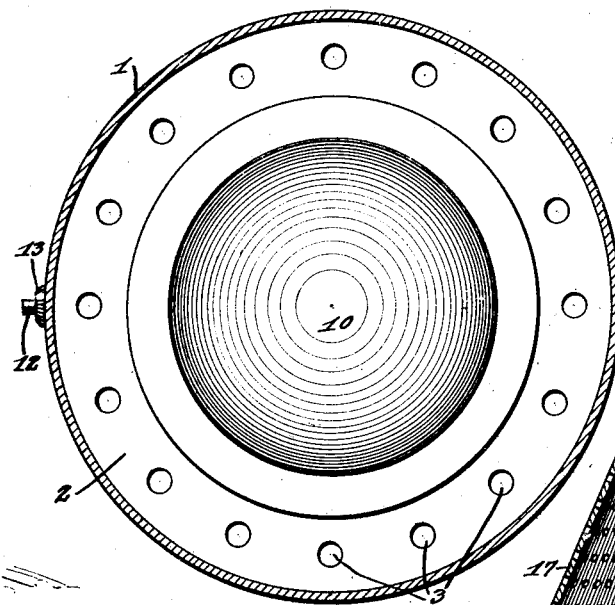
Figure 2 is a transverse sectional view therethrough approximately on the line 2—2 of Figure 1.
Figure 4:
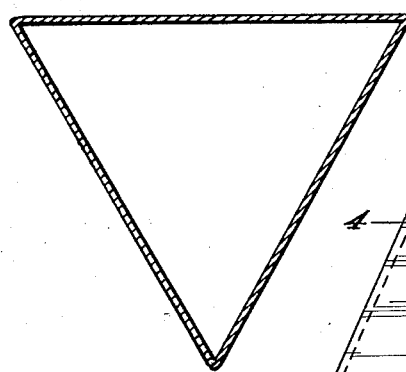
Figure 4 is a transverse sectional view approximately on the line 4—4 of Figure 3.
Figure 3:
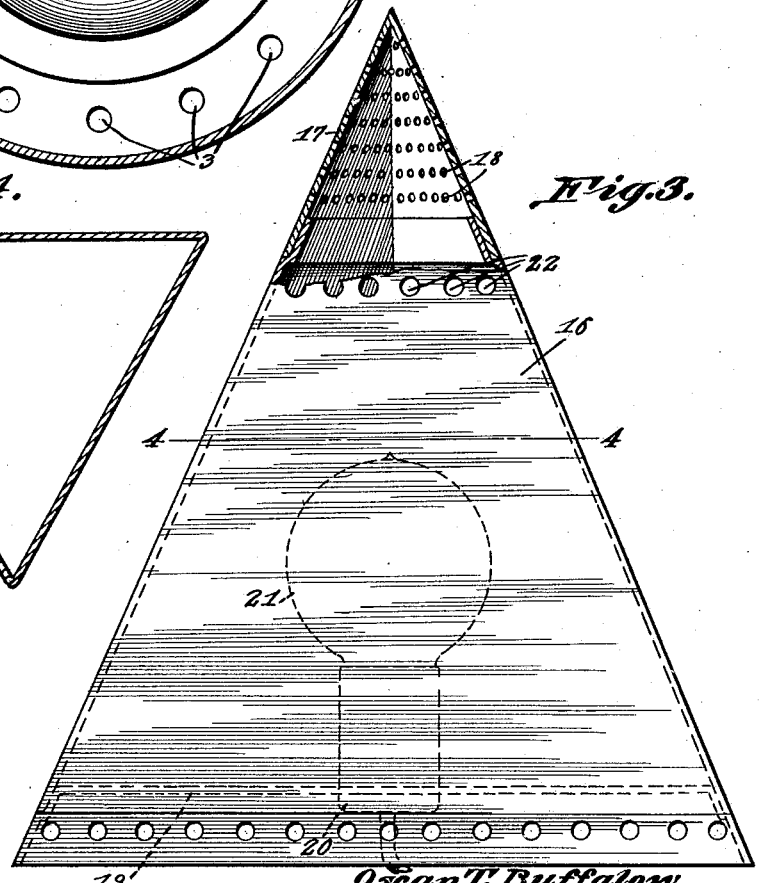
Figure 3 is a side elevation illustrating a second form of the improvement, parts broken away and parts in section.

In Figures 1 and 2 of the drawings, the casing of the improvement is of tubular formation, while in Figures 3 and 4 the casing is of substantially pyramidal formation. These figures illustrate the two preferred forms of the invention but obviously the same may be constructed to provide other shapes. The improvement may be constructed of any desired material, such, for instance, as metal, hard rubber, etc. The tubular casing in Figures 1 and 2 of the drawings, is indicated by the numeral 1. The casing, adjacent to its outer end has let therein a bottom plate 2. The bottom or bottom plate 2 is provided with a series of equidistantly spaced annularly arranged air inlet apertures 3. The open top of the casing is preferably flanged inwardly to provide a shoulder 4 on which the lower edge of the removable top 5 rests, the said top frictionally engaging with the flange at the said top or outer portion of the casing. The casing 1 adjacent the flange 6 is provided with a series of annularly disposed apertures 7 which are preferably of a larger size than the apertures 3. The top 5 is semi-spherical but, of course, hollow and this top is provided with annular series of air inlet apertures 8.

Resting on the base or bottom 2 of the casing 1 there is the stand or base 9 for an electric lamp bulb 10. A plug 11 of insulating material is screwed through a central opening in the lamp base and likewise screwed into the base 9 of the lamp. This plug is the only means employed for holding a lamp in the casing. The covered conductors 12 for the lamp bulb pass through the plug and likewise pass through a ring or washer 13 of insulating material that is let in one side of the casing 1 below the base 2. The conductors for the lamp bulb may be controlled by a suitable switch board 14 and are attached to a socket member 15 designed to be screwed into a wall plug. Except for the shape of the casing 16, illustrated in Figures 3 and 4, the construction is substantially similar to that above described, the apex of the casing 16 affording a removable cover 17, the same being provided with series of air inlet apertures 18. The base or bottom 19 for the casing 16 is disposed a suitable distance above the upper and widened end thereof and this base or bottom 19 has preferably centrally passing therethrough and secured to an opening therein the base 20 of an electric bulb 21. The top of the casing 16 is bent inwardly and extended to provide a flange which frictionally engages the lower wall of the cover 17 and the casing, adjacent to this flange is provided with a series of apertures 22. The insulated conductors for the bulb 21 may pass through the open bottom of the casing 16 or may be directed through a guide ring of insulating material similar to the ring 13.

With our improvement it will be noted that the air entering through the apertures at the bottom and out at top or vice versa, of the casing will be caused to circulate thru the non-apertured portion of the said casing and brought into direct contact with the heat of the bulb 10 or bulb 21.

The apparatus as a whole will be used as a bed warmer to take the place of the hot water bottle or electric pad; by removing the top cover and by placing a pan or suitable vessel on the top of the casing the apparatus may be successfully employed as a stove. In this instance the apertures 7 provide air outlets for the top of the stove. By next removing the casing proper and applying a suitable shade over the bulb the base or first section can be used efficiently for a boudoir lamp, making an efficient three-in-one article.

The construction is simple and may be employed with safety for any of its purposes.

Having described the invention, we claim:

In an apparatus for the purpose set forth, a casing having a bottom plate therein at a distance from one end thereof and the second end of the casing being flanged inwardly, the said casing adjacent to the flange having a series of apertures, a hollow apertured cover removably received on the flanged end of the casing, said casing, adjacent to its bottom plate, having series of apertures therethrough and all of said apertures afford cold air inlets and hot air outlets, an electric bulb arranged approximately centrally in the casing, between the mentioned apertures, a threaded element passing through the bottom for sustaining the bulb in the casing and said element also providing a guide for insulated wires for the lamp bulb.

In testimony whereof we affix our signatures.

OSCAR THOMAS BUFFALOW.
ALBIN HAJOS.